(12) United States Patent
Kismarton (10) Patent No.: US 8,444,087 B2
(45) Date of Patent: May 21, 2013

(54) COMPOSITE SKIN AND STRINGER STRUCTURE AND METHOD FOR FORMING THE SAME

(75) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 1280 days.

(21) Appl. No.: 11/118,594

(22) Filed: Apr. 28, 2005

(65) Prior Publication Data

US 2006/0243860 A1    Nov. 2, 2006

(51) Int. Cl.
*B64C 1/06* (2006.01)

(52) U.S. Cl.
USPC .............................. 244/119; 244/133; 428/113

(58) Field of Classification Search
USPC ............... 244/119, 132, 133; 428/119, 292.1, 428/178, 113; 52/730.1, 721.1, 729.1
See application file for complete search history.

(56) References Cited

U.S. PATENT DOCUMENTS

| | | |
|---|---|---|
| 2,108,041 A | 2/1938 | Colvin, Jr. |
| 2,498,976 A | 2/1950 | Wittman |
| 2,534,722 A | 12/1950 | Meiklejohn, Jr. et al. |
| 2,611,564 A | 9/1952 | Geisse |
| 3,238,690 A | 3/1966 | Wilkins |
| 3,266,130 A | 8/1966 | Glaze |
| 3,381,484 A | 5/1968 | Laughlin |
| 3,490,983 A | 1/1970 | Lee |
| 3,768,760 A | 10/1973 | Jensen |
| 3,975,916 A | 8/1976 | Watson |
| 3,976,269 A * | 8/1976 | Gupta ........................... 244/119 |
| 3,983,900 A | 10/1976 | Airhart |
| 4,084,029 A | 4/1978 | Johnson et al. |
| 4,098,559 A | 7/1978 | Price |
| 4,177,306 A * | 12/1979 | Schulz et al. ................. 428/107 |
| 4,198,018 A | 4/1980 | Brault |
| 4,207,778 A | 6/1980 | Hatch |
| 4,232,844 A | 11/1980 | Sobey |
| 4,310,132 A | 1/1982 | Robinson et al. |
| 4,368,234 A | 1/1983 | Palmer et al. |
| 4,379,798 A * | 4/1983 | Palmer et al. ................. 428/113 |
| 4,413,110 A | 11/1983 | Kavesh et al. |
| 4,425,980 A * | 1/1984 | Miles ........................... 181/208 |
| 4,627,791 A | 12/1986 | Marshall |

(Continued)

FOREIGN PATENT DOCUMENTS

| | | |
|---|---|---|
| DE | 202004007601 U1 | 11/2004 |
| EP | 0433686 A1 | 6/1991 |

(Continued)

OTHER PUBLICATIONS

Gay, "Materiaux Composites," Hermes, Paris, 1997, pp. 107-109.

(Continued)

*Primary Examiner* — Benjamin P Lee (57) ABSTRACT

Composite stringer and skin structures and methods for forming the same are disclosed. In one embodiment, a composite stringer and skin structure includes a polymer-based elongated stringer portion having reinforcing fibers positioned in a plurality of adjacent plies, a first portion of the reinforcing fibers being oriented at a relatively shallow angle relative to a selected reference direction, and a second portion of the reinforcing fibers being oriented at a relatively broad angle relative to the selected reference direction. A polymer-based and fiber reinforced skin member adjoins the stringer portion, and an adhesive material is interposed between the stringer portion and the skin member.

16 Claims, 5 Drawing Sheets

U.S. PATENT DOCUMENTS

| | | | |
|---|---|---|---|
| 4,712,533 A | | 12/1987 | Cruise |
| 4,734,146 A | | 3/1988 | Halcomb et al. |
| 4,741,943 A | | 5/1988 | Hunt |
| 4,808,461 A | | 2/1989 | Boyce et al. |
| 4,908,254 A | * | 3/1990 | Fischer et al. ............... 428/119 |
| 4,966,802 A | | 10/1990 | Hertzberg |
| 5,064,439 A | * | 11/1991 | Chang et al. ................. 264/255 |
| 5,096,772 A | | 3/1992 | Snyder |
| 5,154,370 A | | 10/1992 | Cox et al. |
| 5,164,255 A | | 11/1992 | Weeks |
| 5,242,523 A | * | 9/1993 | Willden et al. ............... 156/285 |
| 5,251,848 A | | 10/1993 | Gannatal |
| 5,269,657 A | | 12/1993 | Garfinkle |
| 5,306,557 A | | 4/1994 | Madison |
| 5,333,568 A | | 8/1994 | Meldner et al. |
| 5,342,465 A | * | 8/1994 | Bronowicki et al. ......... 156/175 |
| 5,362,345 A | | 11/1994 | Stettler et al. |
| 5,429,066 A | | 7/1995 | Lewit et al. |
| 5,429,326 A | * | 7/1995 | Garesche et al. ............. 244/133 |
| 5,476,704 A | * | 12/1995 | Kohler .......................... 428/119 |
| 5,518,208 A | * | 5/1996 | Roseburg ...................... 244/132 |
| 5,538,781 A | | 7/1996 | Rao et al. |
| 5,632,940 A | | 5/1997 | Whatley |
| 5,669,999 A | | 9/1997 | Anderegg et al. |
| 5,733,390 A | * | 3/1998 | Kingston ...................... 148/537 |
| 5,735,486 A | * | 4/1998 | Piening et al. ................ 244/124 |
| 5,766,724 A | | 6/1998 | Tailor et al. |
| 5,833,786 A | | 11/1998 | McCarville et al. |
| 5,866,272 A | * | 2/1999 | Westre et al. ................. 428/593 |
| 5,922,446 A | * | 7/1999 | Piening et al. ............. 428/292.1 |
| 5,958,550 A | | 9/1999 | Childress |
| 5,972,524 A | | 10/1999 | Childress |
| 6,024,325 A | | 2/2000 | Carter, Jr. |
| 6,037,060 A | | 3/2000 | Blohowiak et al. |
| 6,114,050 A | | 9/2000 | Westre et al. |
| H1872 H | | 10/2000 | Bowman |
| 6,277,463 B1 | | 8/2001 | Hamilton et al. |
| 6,306,239 B1 | | 10/2001 | Breuer et al. |
| 6,320,118 B1 | | 11/2001 | Pridham et al. |
| 6,355,337 B1 | * | 3/2002 | Piening et al. ................ 428/223 |
| 6,355,584 B1 | | 3/2002 | Corrons |
| 6,372,072 B1 | * | 4/2002 | Healey .......................... 156/148 |
| 6,405,978 B1 | | 6/2002 | Dean et al. |
| 6,436,507 B1 | | 8/2002 | Pannell |
| 6,502,788 B2 | * | 1/2003 | Noda et al. ................. 244/123.3 |
| 6,511,570 B2 | * | 1/2003 | Matsui .......................... 156/245 |
| 6,554,225 B1 | * | 4/2003 | Anast et al. ............... 244/117 R |
| 6,565,944 B1 | | 5/2003 | Hartness et al. |
| 6,641,693 B2 | | 11/2003 | Guckert et al. |
| 6,641,893 B1 | | 11/2003 | Suresh et al. |
| 6,655,633 B1 | | 12/2003 | Chapman, Jr. |
| 6,703,118 B2 | | 3/2004 | van Weperen et al. |
| 6,729,792 B2 | | 5/2004 | Pritzer |
| 6,779,830 B2 | | 8/2004 | Patberg et al. |
| 6,835,341 B2 | | 12/2004 | Noda et al. |
| 6,886,780 B1 | | 5/2005 | Frontera Castaner |
| 6,914,021 B2 | | 7/2005 | Sidwell |
| 7,080,805 B2 | * | 7/2006 | Prichard et al. ........... 244/117 R |
| 7,115,323 B2 | * | 10/2006 | Westre et al. ................. 428/593 |
| 7,159,822 B2 | * | 1/2007 | Grantham et al. ............ 244/119 |
| 2002/0015819 A1 | * | 2/2002 | Edwards et al. .............. 428/114 |
| 2003/0148082 A1 | | 8/2003 | Bompard et al. |
| 2003/0168555 A1 | * | 9/2003 | Livi et al. ...................... 244/132 |
| 2003/0189131 A1 | | 10/2003 | Cloud et al. |
| 2004/0213952 A1 | | 10/2004 | Takemura et al. |
| 2004/0265536 A1 | * | 12/2004 | Sana et al. .................... 428/119 |
| 2005/0153098 A1 | | 7/2005 | Bhatnagar et al. |
| 2005/0263645 A1 | * | 12/2005 | Johnson et al. ............... 244/119 |
| 2006/0226287 A1 | * | 10/2006 | Grantham et al. ............ 244/119 |
| 2006/0237588 A1 | | 10/2006 | Kismarton |

FOREIGN PATENT DOCUMENTS

| | | |
|---|---|---|
| EP | 1174533 A1 | 1/2002 |
| EP | 1336469 A1 | 8/2003 |
| EP | 1762666 A1 | 3/2007 |
| FR | 2660892 | 10/1991 |
| GB | 2238977 A | 6/1991 |
| JP | 2003066968 | 3/2003 |
| WO | WO9640551 | 12/1996 |
| WO | WO0216197 A1 | 2/2002 |
| WO | WO0216784 A2 | 2/2002 |

OTHER PUBLICATIONS

PCT Intl Search Report and Written Opinion for Application No. PCT/US2006/010703, dated Oct. 20, 2006, 13 pages.

Garfinkle et al., "Aerospace: Smart Spars, Intrinsically-Smart Composite Structures", Fiber Architects, High Performance Textile Consultants, http://fiberarchitects.com/aerospace/spar.html, pp. 1-8, Jan. 1999.

PCT Intl Search Report and Written Opinion for Application No. PCT/US2006/009730, dated Oct. 10, 2006, 13 pages.

* cited by examiner

FIG.6

COMPOSITE SKIN AND STRINGER STRUCTURE AND METHOD FOR FORMING THE SAME

CROSS REFERENCE TO RELATED APPLICATIONS

This patent application is related to the following co-pending, commonly-owned U.S. patent applications, which applications are hereby incorporated by reference: U.S. patent application Ser. No. 11/096,743 entitled "Composite Structural Member and Method for Forming the Same"; U.S. patent application Ser. No. 11/096,796 entitled "Hybrid Fiberglass Composite Structures and Methods for Forming the Same"; U.S. patent application Ser. No. 11/096,727 entitled "Multi-Axial Laminate Composite Structures and Methods of Forming the Same"; U.S. patent application Ser. No. 11/096,795 entitled "Composite Structural Member Having an Undulating Web and Method for Forming the Same".

FIELD OF THE INVENTION

This invention relates generally to composite structural components, and more particularly, to a composite skin and stringer structure.

BACKGROUND OF THE INVENTION

Structural members are available in a wide variety of configurations to provide structural support under a variety of loading conditions. In particular, the wing and empennage surfaces of an aircraft typically include parallel and spanwise oriented structural members called stringers that are coupled to skin members on the wing and empennage surfaces that cooperatively provide the desired flexural and torsional stiffness to the wing and empennage surfaces. Typically, the wing and empennage surfaces are fabricated from a metal, such as aluminum, steel or titanium, and the stringer includes a planar web portion that is generally oriented in a direction approximately perpendicular to the skin member and extending in a span wise direction along the wing or empennage surface so that the web portion offers resistance to a bending moment generated by the load. A flange portion may be positioned on one or both of the longitudinal edges of the web portion in order to provide resistance to localized failure of the web portion due to lateral buckling. The flange portion further allows the stringer to be coupled to the skin member by providing an attachment surface for the skin member.

Reinforced polymer-based materials are also available that may be used to form various structural members, and may be used as a substitute for metals, particularly in applications where relatively low weight and high mechanical strength is desired. As a result, reinforced polymer-based materials are widely used in a variety of commercial and military aircraft, terrestrial vehicles and consumer products. The material is generally comprised of a network of reinforcing fibers that are generally applied in layers, and a polymeric resin that substantially wets the reinforcing fibers to form an intimate contact between the resin and the reinforcing fibers. The material may then be formed into a structural component by a variety of known forming methods, such as an extrusion process or other forming processes.

Although desirable results have been achieved using prior art apparatus and methods, a stringer and skin structure that may be more easily and inexpensively fabricated, and that may provide a more favorable strength to weight ratio in comparison to conventional stringer and skin structures, would have utility.

SUMMARY

Composite stringer and skin structures and methods for forming the same are disclosed. In one embodiment, a composite stringer and skin structure includes a polymer-based elongated stringer portion having reinforcing fibers positioned in a plurality of adjacent plies, a first portion of the reinforcing fibers being oriented at a relatively shallow angle relative to a selected reference direction, and a second portion of the reinforcing fibers being oriented at a relatively broad angle relative to the selected reference direction. A polymer-based and fiber reinforced skin member adjoins the stringer portion, and an adhesive material is interposed between the stringer portion and the skin member.

BRIEF DESCRIPTION OF THE DRAWINGS

The disclosed embodiments of the present invention are described in detail below with reference to the following drawings.

DETAILED DESCRIPTION

The present invention relates to composite skin and stringer structures and methods for forming such structures. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description. In the present discussion, it is understood that the term "reinforced polymer-based material" includes various non-homogeneous polymer-based materials, commonly referred to as "reinforced composites", "carbon-fiber composites", or still other terms known in the art.

Figure 1:
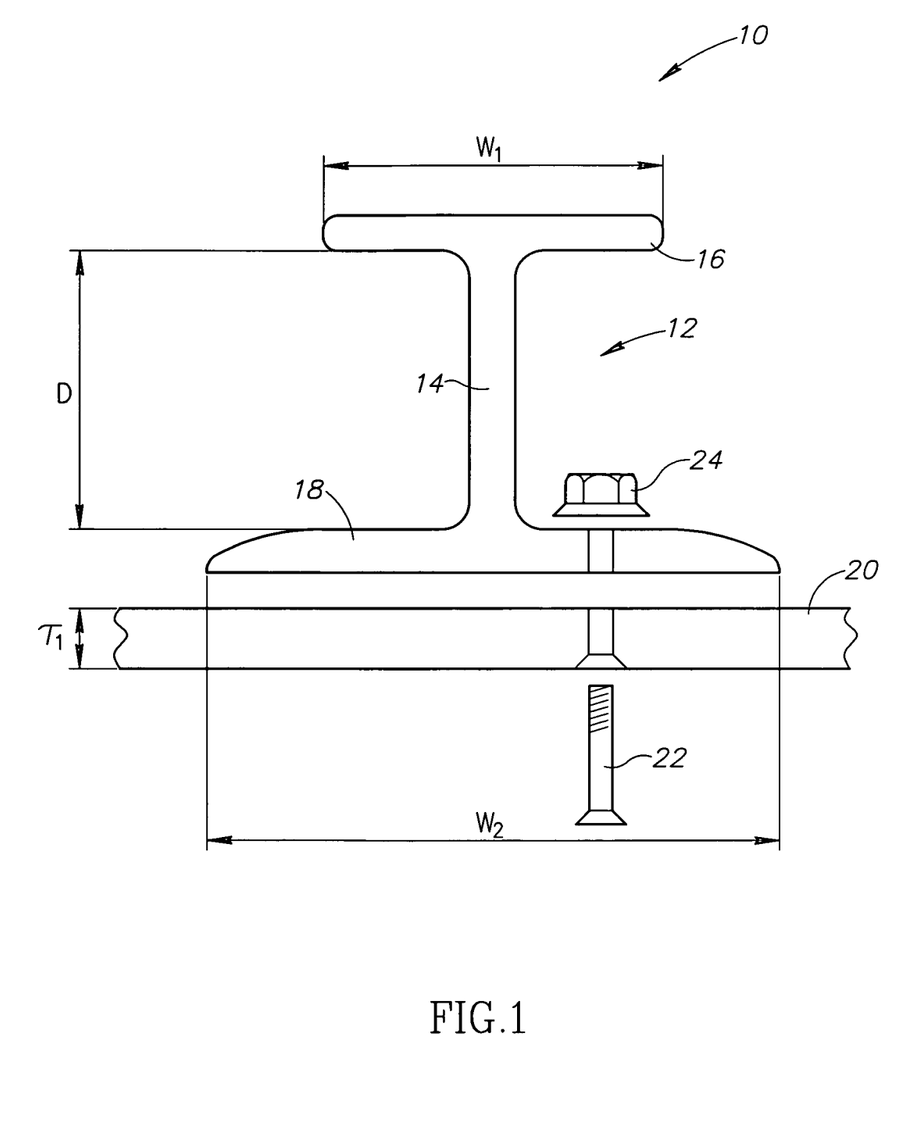
FIG. 1 is an exploded, partial cross sectional view of a composite skin and stringer assembly according to an embodiment of the invention.

FIG. 1 is an exploded, partial cross sectional view of a composite skin and stringer assembly 10 according to an embodiment of the invention. The composite skin and stringer assembly 10 includes an elongated stringer portion 12 having a web portion 14 that is positioned between a first flange portion 16 and an opposing second flange portion 18. The web portion 14 may have a predetermined depth D in order to provide a desired resistance to an applied loading. The first flange portion 16 and the second flange portion 18 are generally planar members having predetermined widths $W_1$ and $W_2$, respectively. The web portion 14 and the first flange portion 16 and the second flange portion 18 may be constant along a span of the stringer portion 12 (i.e. into the page), or they may vary continuously, or even non-continuously along the span of the stringer portion 12. The web portion 14 and the first flange portion 16 and the second flange portion 18 are generally formed from a reinforced polymer-based material having multiple layers of reinforcing fibers oriented in a predetermined orientation. The orientation of the reinforcing fibers in the multiple layers will be described in greater detail below.

The assembly 10 also includes a skin member 20 having a desired thickness $t_1$ that is coupled to the second flange 18 using, for example, a suitable adhesive material. In general, one of the stringer portion 12 and the skin member 20 may be in a relatively uncured state, while the other may be in a relatively cured state. For example, and in one particular embodiment, the skin member 20 may be coupled to the second flange 18 by interposing a film adhesive material between a relatively uncured skin member 20 and the second flange 18 of a relatively cured stringer portion 12. The film adhesive is then cured while the uncured skin member 20 is cured, thus forming an adhesive bond between the second flange 18 and the skin member 20. Alternately, the film adhesive may be interposed between a relatively cured skin member 20 and a relatively uncured stringer portion 12, so that the adhesive bond is formed while the stringer portion 12 is cured. One suitable film adhesive is the FM-300 film adhesive, available from Cytec Industries, Incorporated of West Paterson, N.J. although other suitable alternatives exist. In another particular embodiment, the stringer portion 12 and the skin member 20 may both be in a fully cured state, and a suitable paste adhesive may be interposed between the second flange portion 18 and the skin member 20. The skin member 20 is also generally formed from a reinforced polymer-based material having multiple layers of reinforcing fibers oriented in a predetermined orientation. The orientation of the reinforcing fibers in the multiple layers will also be described in greater detail below.

Still referring to FIG. 1, the skin member 20 and the second flange portion 18 may include a least one set of corresponding apertures that project through the skin member 20 and the second flange portion 18. The apertures are suitably sized to accommodate a fastener 22 that threadably engages a nut portion 24 that cooperatively couple the skin member 20 and the second flange portion 18. The fasteners 22 and the nut portions 24 further cooperatively impart a predetermined compressive force to the skin member 20 and the second flange portion 18 when a predetermined torque is imparted to the fastener 22. In one particular embodiment, the fasteners 22 and the corresponding nut portions 24 may be selected from the well-known National Aerospace Standard (NAS) series of structural bolts and corresponding nut portions, although other alternative fasteners exist. For example, the HI-SHEAR, HI-LOK or HI-LOK/HI-TIGUE fastening systems available from the Hi-Shear Corporation of Torrance, Calif. may also be used to couple the skin member 20 and the second flange portion 18. The foregoing fastening systems develop a predetermined tension by including a shear portion that breaks during installation when the predetermined tension is achieved. Consequently, a torque inspection following installation is unnecessary. The one or more fasteners 22 may advantageously reinforce the adhesive bonding between the second flange portion 18 and the skin member 20, and further may advantageously provide a crack-arresting feature.

Figure 2:
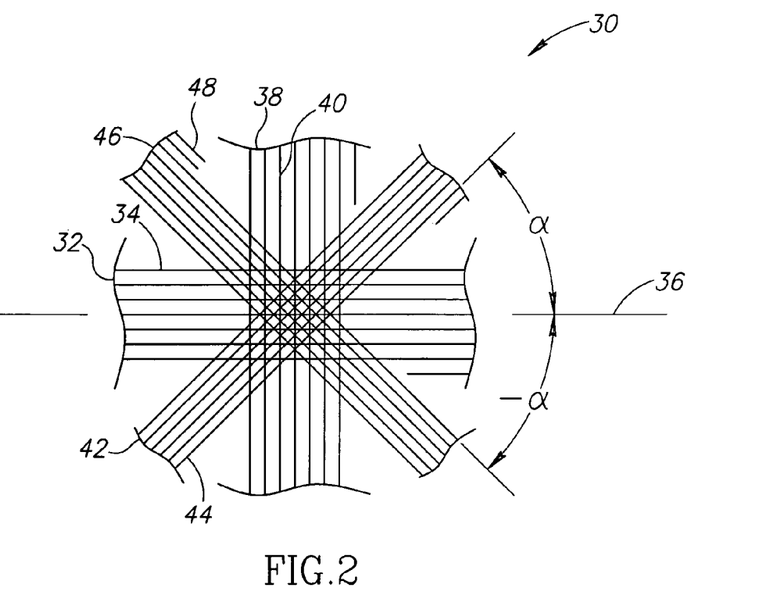
FIG. 2 is a schematic view of a ply arrangement for the skin member of FIG. 1, according to another embodiment of the invention.

FIG. 2 is a schematic view of a ply arrangement 30 for the skin member 20 of FIG. 1, according to another embodiment of the invention. The ply arrangement 30 includes a plurality of interleaved plies that further include generally parallel reinforcing fibers. Accordingly, the ply arrangement 30 includes a first layer 32 having reinforcing fibers 34 that are oriented generally in parallel with respect to a predetermined orientation direction 36. A second layer 38 includes reinforcing fibers 40 oriented generally perpendicular to the reference direction 36. A third layer 42 includes reinforcing fibers 44 oriented at an angle $\alpha$ with respect to the reference direction 36, and a fourth layer 46 that includes reinforcing fibers 48 oriented at an angle $-\alpha$ with respect to the reference direction 36. Although the angle $\alpha$ may be any angle that is intermediate between the orientation of the reinforcing fibers 34 of the first layer 34, and the reinforcing fibers 40 of the second layer 38, in a particular embodiment, the angle $\alpha$ is approximately about forty-five degrees.

Still referring to FIG. 2, the first layer 32, the second layer 38, the third layer 42 and the fourth layer 46 may have any desired thicknesses, and the fibers 34, 40, 44 and 48 may be of any desired compositions, but in one particular embodiment, the reinforcing fibers 44, 48 and 40 in the third layer 42, the fourth layer 46 and the second layer 38, respectively, are intermediate to high modulus carbon fibers, having a modulus of at least about 50 M-lbs. per square inch. One suitable carbon fiber is the M-40J carbon fibers available from Toray Carbon Fibers America, Incorporated, of Decatur, Ala., although other suitable alternatives are available. In the same particular embodiment, the reinforcing fibers 34 in the first layer 32 are generally high strength carbon fibers having a modulus of at least about 40 M-lbs. per square inch, such as the T-800 carbon fibers, also available from Toray Carbon Fibers America, Incorporated, although other suitable alternatives exist.

The first layer 32, the second layer 38, the third layer 42 and the fourth layer 46 of the ply arrangement 30 may be present in the skin member 20 of FIG. 1 in any desired interleaved arrangement and in any relative proportion. For example, and in another particular embodiment, the skin member 20 includes approximately about ten percent of the first layer 32, approximately eighty percent of the third layer 42 and the fourth layer 46, and approximately about ten percent of the second layer 38, where the stated percentages are with reference to the total number of layers in the structure. In yet another particular embodiment, the third layer 42 is approximately about forty percent of the skin member 20, and the fourth layer 46 is approximately about forty percent of the skin member 20.

Figure 3:
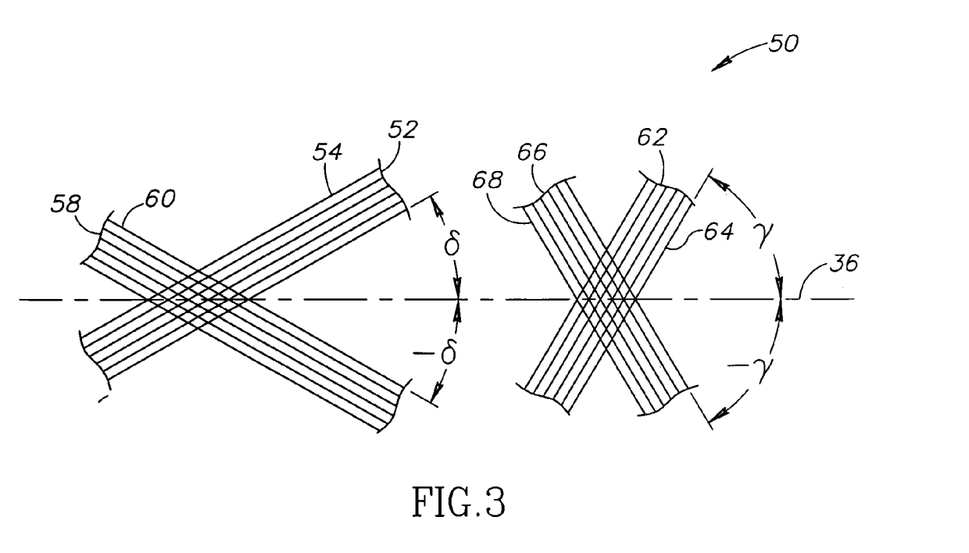
FIG. 3 is a schematic view of a ply arrangement for the stringer portion of FIG. 1, according to still another embodiment of the invention.

FIG. 3 is a schematic view of a ply arrangement 50 for the stringer portion 12 of FIG. 1, according to still another embodiment of the invention. The ply arrangement 50 also includes a plurality of interleaved plies that further include generally parallel reinforcing fibers. The ply arrangement 50 includes a first layer 52 having reinforcing fibers 54 that are oriented at an angle $\delta$ with respect to the predetermined orientation direction 36. A second layer 58 includes reinforcing fibers 60 oriented at an angle $-\delta$ with respect to the reference direction 36. A third layer 62 includes reinforcing fibers 64 oriented at an angle $\gamma$ with respect to the reference direction 36, and a fourth layer 66 that includes reinforcing fibers 68 oriented at an angle $-\gamma$ with respect to the reference direction 36. The angles $\delta$ and $-\delta$ are relatively shallow angles that range in magnitude from approximately about zero degrees and approximately about twenty degrees. In a particular embodiment, the angle $\delta$ is approximately about five degrees. The angles $\gamma$ and $-\gamma$ are, in contrast, relatively broad angles having a magnitude generally greater than the shallow angles. The broad angles γ and −γ therefore have magnitudes that range from approximately about forty-five degrees and approximately about ninety degrees. In another particular embodiment, the angle γ is approximately about sixty-five degrees.

The first layer 52, the second layer 58, the third layer 62 and the fourth layer 66 may have any desired thickness, and the fibers 54, 60, 64 and 68 may be of any desired composition. In a particular embodiment, however, the reinforcing fibers 54, 60, 64 and 68 are generally high strength carbon fibers having a modulus of at least about 40 M-lbs. per square inch, such as the aforementioned T-800 carbon fibers, available from Toray Carbon Fibers America, Incorporated. The first layer 52, the second layer 58, the third layer 62 and the fourth layer 66 of the ply arrangement 50 may be present in the stringer portion 20 of FIG. 1 in any desired interleaved arrangement and in any relative proportion. For example, and in another particular embodiment, the stringer portion 12 includes approximately about eighty percent of the first layer 52 and the second layer 58, and approximately twenty percent of the third layer 62 and the fourth layer 66.

Figure 4:
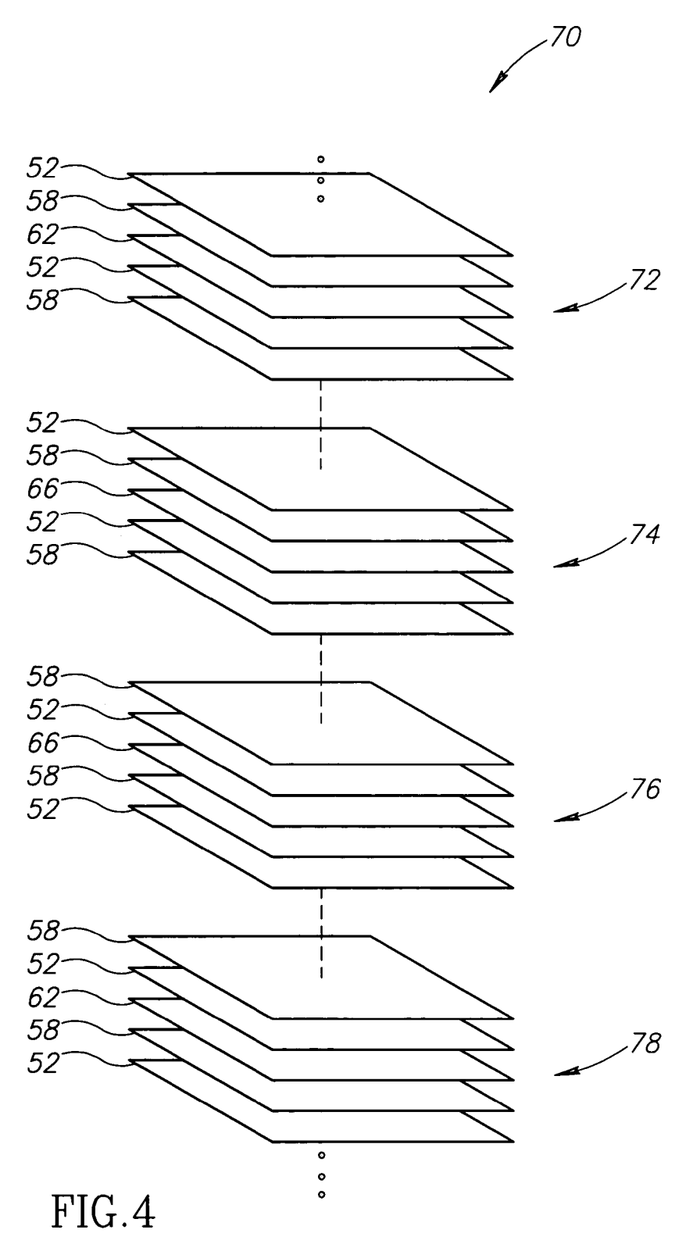
FIG. 4 is a schematic view of a ply arrangement for the stringer portion according to yet another embodiment of the invention.

With reference still to FIG. 3, and now also to FIG. 4, a ply arrangement 70 according to yet another embodiment of the invention will now be described. The ply arrangement 70 includes a first layer group 72 that includes the first layer 52, the second layer 58 and the third layer 62 of FIG. 3 in the ordered arrangement shown. A second layer group 74 also includes the first layer 52 and the second layer 58 of FIG. 3, and also includes the fourth layer 66. A third layer group 76 also includes the first layer 52, the second layer 58, and the fourth layer 66. In contrast to the second layer group 74, however, the positions of the first layer 52 and the second layer 58 are juxtaposed. A fourth layer group 78 includes the first layer 52, the second layer 58 and the third layer 66 in the ordered arrangement shown. The first layer group 72, the second layer group 74, the third layer group 76 and the fourth layer group 78 may be repeated within the stringer portion 12 (FIG. 1) as desired to generate a desired thickness in the stringer portion 12. Moreover, it is understood that the thickness of the first layer group 72, the second layer group 74, the third layer group 76 and the fourth layer group 78 may have approximately equivalent individual thicknesses, or they may be independently varied. In a particular embodiment, the individual layers in the first layer group 72, the second layer group 74, the third layer group 76 and the fourth layer group 78 may be formed using a polymer tape material, or "prepreg" material, that includes a plurality of fiber reinforcement fibers. Suitable pre-preg materials are also available from Toray Carbon Fibers America, Incorporated.

Figure 5:
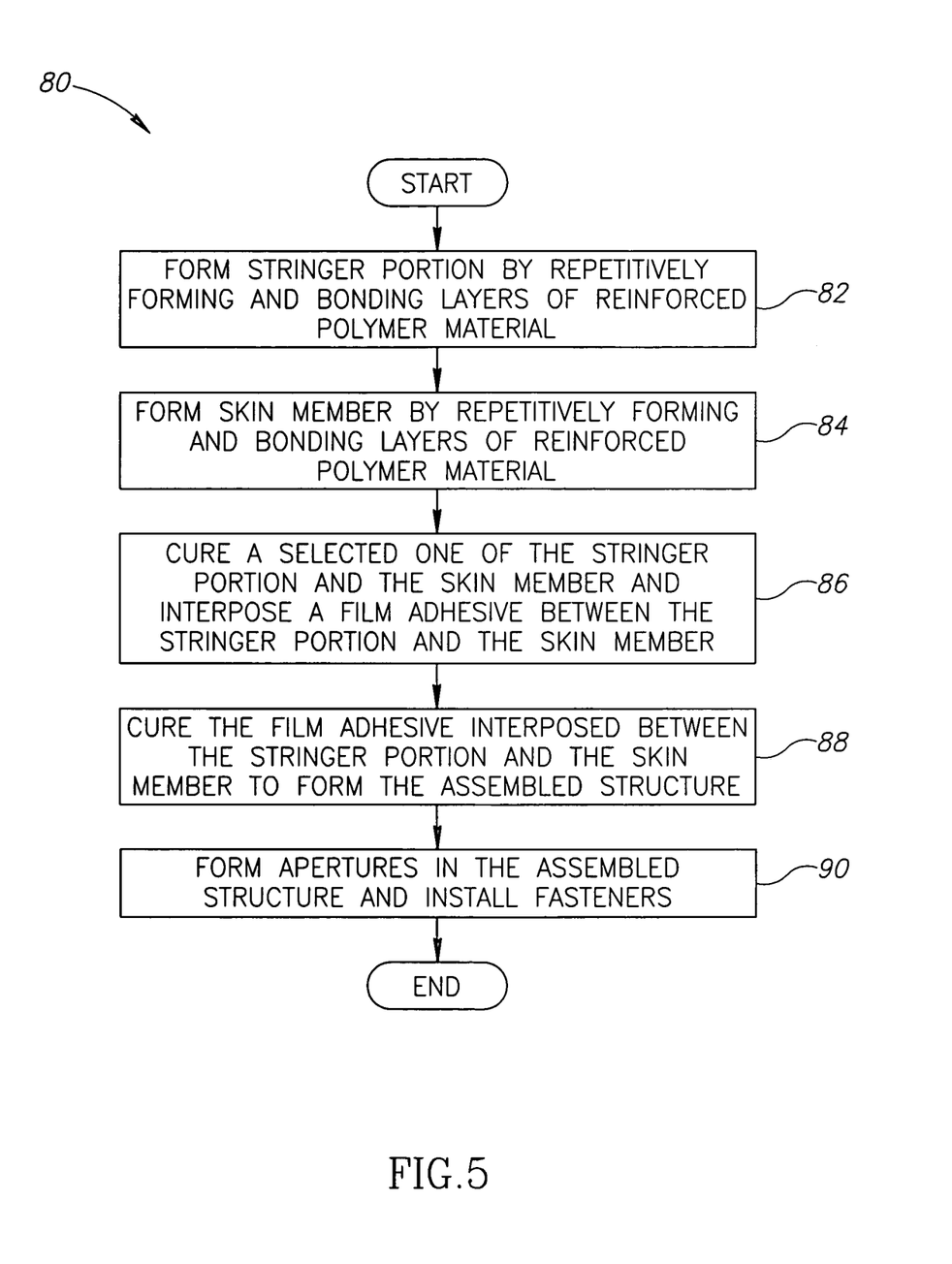
FIG. 5 is a flowchart that shows a method of making a composite stringer and skin structure according to still yet another embodiment of the invention.

FIG. 5 is a flowchart that shows a method 80 of making a composite stringer and skin structure according to still yet another embodiment of the invention. At block 82, a stringer portion is generated by repetitively forming the first layer 52, the second layer 58, the third layer 62 and the fourth layer 66, and bonding the layers 52, 58, 62 and 66 as shown in FIG. 3. More specifically, the foregoing layers may also be formed according to the ply arrangement 70 shown in FIG. 4. At block 84, a skin member is generated by repetitively forming the first layer 32, the second layer 38, the third layer 42 and the fourth layer 46, and bonding the layers 32, 38, 42 and 46 as shown in FIG. 2. At block 86, at least one of the stringer portion and the skin member may be cured, and a film adhesive may be interposed between the cured member and the uncured member of the stringer and skin structure. At block 86, the film adhesive and possibly any other uncured member are then cured by subjecting the stringer portion, the film adhesive and the skin member to a predetermined thermal environment to bond stringer portion to the skin member. At block 90, apertures may be formed in the assembled structure by drilling, abrasive jet cutting, or by other suitable processes. Fasteners are then installed in the apertures and torqued to a prescribed value.

Figure 6:
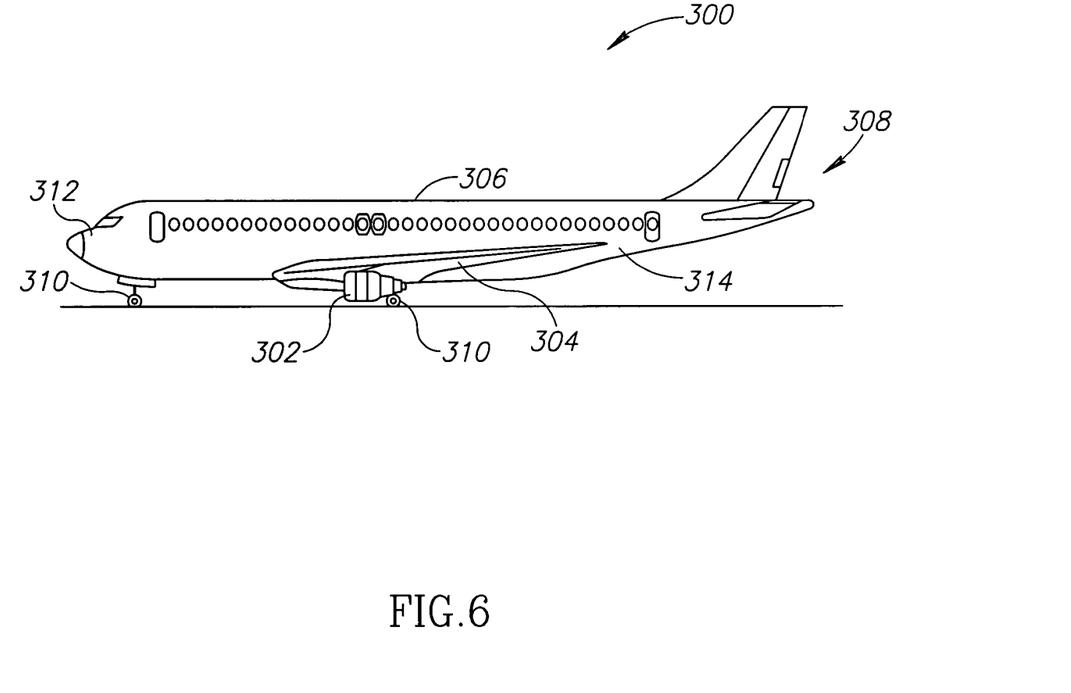
FIG. 6 is a side elevation view of an aircraft having one or more of the disclosed embodiments of the present invention.

Those skilled in the art will also readily recognize that the foregoing embodiments may be incorporated into a wide variety of different systems. Referring now in particular to FIG. 6, a side elevation view of an aircraft 300 having one or more of the disclosed embodiments of the present invention is shown. The aircraft 300 generally includes a variety of components and subsystems known in the pertinent art, which in the interest of brevity, will not be described in detail. For example, the aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306, and a flight control system 312 (not shown in FIG. 6), as well as a plurality of other electrical, mechanical and electromechanical systems that cooperatively perform a variety of tasks necessary for the operation of the aircraft 300.

With reference still to FIG. 6, the aircraft 300 may include one or more of the embodiments of the composite stringer and skin structure 314 according to the present invention, which may be incorporated into various structural portions of the aircraft 300. For example, the various disclosed embodiments may be used to form structural portions in the wing assemblies 304 and/or structural portions in the tail assembly 308.

The aircraft 300 is generally representative of a commercial passenger aircraft, which may include, for example, the 737, 747, 757, 767 and 777 commercial passenger aircraft available from The Boeing Company of Chicago, Ill. In alternate embodiments, the present invention may also be incorporated into flight vehicles of other types. Examples of such flight vehicles include manned or unmanned military aircraft, rotary wing aircraft, or even ballistic flight vehicles, as illustrated more fully in various descriptive volumes, such as Jane's All The World's Aircraft, available from Jane's Information Group, Ltd. of Coulsdon, Surrey, UK.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. An aerospace vehicle comprising:
 a fiber-reinforced composite stringer having reinforcing fibers positioned in a plurality of adjacent plies, a first one of the plies having reinforcing fibers oriented at a first non-zero angle between approximately zero degrees to twenty degrees relative to a direction of loading, a second one of the plies having reinforcing fibers oriented at about +65 degrees relative to the loading direction, and a third one of the plies having reinforcing fibers oriented at about −65 degrees relative to the loading direction; and
 a skin member secured to a flange of the stringer.

2. The vehicle of claim 1, wherein the first angle is approximately five degrees.

3. The vehicle of claim 1, wherein the stringer and the skin member are comprised of reinforcement fibers having different moduli.

4. A method of fabricating the stringer and skin structure of claim 1, comprising:

forming the stringer by bonding first plies of reinforced fibers oriented at a first angle between approximately zero degrees to twenty degrees relative to a reference direction to second and third plies of reinforced fibers oriented at second and third angles of between approximately +65 degrees and −65 degrees relative to the selected reference direction; and adhesively joining the stringer to the skin member.

5. The method of claim 4, wherein forming a stringer member comprises bonding the first plies of the reinforcing fibers oriented at a first angle of approximately five degrees to the second plies of the reinforcing fibers oriented at a second angle of approximately sixty-five degrees.

6. The method of claim 4, wherein the first plies include a first layer oriented at a positive first angle, and a second layer oriented at a negative first angle, and wherein the second plies includes a third layer oriented at a positive second angle, and a fourth layer oriented at a negative second angle.

7. The method of claim 6, wherein forming a stringer member further comprises forming a first layer group, a second layer group, a third layer group and a fourth layer group, wherein forming each layer group includes bonding five layers selected from the first layer, the second layer, the third layer and the fourth layer.

8. The method of claim 7, wherein forming each of the first layer group and the fourth layer group include interposing a third layer between a selected pair of the first and second layers.

9. The method of claim 7, wherein forming each of the second layer group and the third layer group includes interposing the fourth layer between a selected pair of the first and second layers.

10. The method of claim 4, wherein adhesively joining the stringer member to the skin member further comprises curing at least one of the stringer portion and the skin member, interposing a film adhesive between the stringer portion and the skin member, and curing the film adhesive.

11. The method of claim 4, wherein adhesively joining the stringer member to the skin member comprises interposing a paste adhesive between the stringer portion and the skin member.

12. The method of claim 4, further comprising forming at least one aperture that projects through a selected portion of the stringer member and the skin member, inserting a fastener in the at least one aperture, and applying a predetermined torque to the fastener to generate a predetermined compressive force.

13. The vehicle of claim 1, wherein the fibers oriented at the first angle comprise approximately about eighty percent of the total number of fibers in the stringer.

14. A stringer for an aerospace vehicle, the stringer comprising first and second flanges and a web between the flanges, at least one of the flanges and web including first, second and third plies of reinforcing fibers, the fibers in the first ply oriented at a non-zero angle between 0 and 20 degrees with respect to an axis of loading, the fibers in the second and third plies oriented at an angle of about +65 degrees and −65 degrees with respect to the axis.

15. The stringer of claim 14, wherein the fibers in the first ply are oriented at an angle of approximately five degrees.

16. The stringer of claim 14, wherein the fibers oriented at the angle between 0 and 20 degrees are oriented at about 5 degrees and comprise approximately about eighty percent of the total number of fibers in the flanges.

* * * * *